3,205,219
6(HEXAHYDROBENZYLOXYCARBONYLAMINO)-
PENICILLANIC ACID
Lucien Penasse, Paris, Gérard Nomine, Noisy-le-Sec, Guy
R. Hagemann, Nogent-sur-Marne, and Pierre Barthe-
lemy, Clichy-sous-Bois, France, assignors to Roussel-
UCLAF, S.A., Paris, France, a corporation of France
No Drawing. Filed July 24, 1963, Ser. No. 297,191
Claims priority, application France, Aug. 31, 1962,
908,344; Feb. 20, 1963, 925,432; Apr. 10, 1963,
931,089
7 Claims. (Cl. 260—210)

The invention relates to the novel penicillin derivative, N-(hexahydrobenzyloxycarbonyl)-6-amino penicillanate of propionyl erythromycin, and to a novel process for its preparation and to novel intermediates thereof. The invention further relates to novel antibiotic compositions and to a novel method of combatting microbial infections.

It is an object of the invention to provide the novel product, N-(hexahydrobenzyloxycarbonyl)-6-amino-penicillanate of propionyl erythromycin.

It is another object of the invention to provide a novel process for the preparation of N-(hexahydrobenzyloxycarbonyl)-6-amino-penicillanate of propionyl erythromycin.

It is another object of the invention to provide novel intermediates for N-(hexahydrobenzyloxycarbonyl)-6-amino-penicillanate of propionyl erythromycin.

It is a further object of the invention to provide novel antibiotic compositions.

It is an additional object of the invention to provide a novel method of combatting microbial infections.

These and other objects and advantages of the invention will become obvious from the following detailed description.

The novel product of the invention is N-(hexahydrobenzyloxycarbonyl)-6-amino-penicillanate of propionyl ethyromycin having the formula

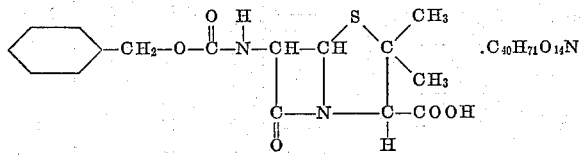

The said salt consists of 31% by weight of N-(hexahydrobenzyloxycarbonyl)-6-amino-penicillanic acid and 69% by weight of propionyl erythromycin.

The process of the invention for the preparation of N - (hexahydrobenzyloxycarbonyl)-6-amino-penicillanate of propionyl erythromycin comprises reacting 6-amino-penicillanic acid or an alkali metal salt thereof with a hexahydrobenzyl haloformate, such as hexahydrobenzyl chloroformate in an aqueous medium, such as aqueous acetone to form N-(hexahydrobenzyloxycarbonyl)-6-amino-penicillanic acid, reacting the latter in its acid form or in the form of its alkali metal salt with propionyl erythromycin or a salt thereof in a water-miscible solvent to form N-(hexahydrobenzyloxycarbonyl)-6-amino-penicillanate of propionyl erythromycin and recovering the latter.

A preferred mode of the process of the invention for the preparation of N-(hexahydrobenzyloxycarbonyl)-6-amino-penicillanate of propionyl erythromycin comprises reacting the sodium salt of 6-amino-penicillanic acid with hexahydrobenzyl chloroformate in an aqueous acetone medium to form a solution of the sodium salt of N - (hexahydrobenzyloxycarbonyl)-6-amino - penicillanic acid, extracting any excess hexahydrobenzyl chloroformate with an inert solvent, such as ether, adding a neutral organic solvent, such as methyl ethyl ketone and acidifying the mixture to a pH of about 2 to form a solution of the said penicillanic acid in the organic solvent, reacting the said penicillanic acid with an amine, such as a N-lower alkyl-piperidine to form the corresponding amine salt of N-(hexahydrobenzyloxycarbonyl)-6-amino-penicillanic acid which can be purified by recrystallization from an organic solvent such as acetone or ethyl acetate, forming N-(hexahydrobenzyloxycarbonyl)-6-amino-penicillanic acid by acidification and reacting the latter with propionyl erythromycin in an inert organic solvent, such as acetone to form N-(hexahydrobenzyloxycarbonyl) - 6 - amino-penicillanate of propionyl erythromycin and recovering the latter.

The novel antibiotic compositions of the invention are comprised of N-(hexahydrobenzyloxycarbonyl)-6-amino-penicillanate of propionyl erythromycin and a major amount of a pharmacological carrier. The compositions may be prepared in the form of injectable suspensions, in ampules and multi-dose flacons, in tablets, coated tablets, flavored powders, syrups, suppositories, capsules, dermatological ointments, ophthalmic ointments and nasal ointments and in the form of pulverized topical powders prepared in the usual manner.

The compositions of the invention possess remarkable antibiotic and antibacterial activity and are particularly effective against staphylococci. They are active in vitro and particularly in vivo against microbial strains which are resistant to penicillin or erythromycin and are useful for the treatment of staphylococcia, streptococcia and pneumococci infections.

N - (hexahydrobenzyloxycarbonyl)-6-amino-penicillanate of propionyl erythromycin has a definite synergistic effect which has been demonstrated on a variety of pathogenic staphylococci and is also effective against other microbial strains than staphylococci. When administered per os, the said salt produces a very distinct synergistic activity in staphylococci infections, hemolytic streptococcus infections and pneumococci. The said compound is useful for prophylaxis and the treatment of acute articular rheumatism.

The novel method of combatting microbial infections comprises administering an effective amount of N-(hexahydrobenzyloxycarbonyl) - 6 - amino - penicillanate of propionyl erythromycin. The said salt may be administered perorally, transcutaneously, rectally or locally by topical application to the skin and mucous membranes. The usual useful dosages are 125 to 500 mgm. per dose and 500 to 2500 mgm. per day in adults depending upon the method of administration.

In the following examples there are described several preferred embodiments to illustrate the invention. However, it should be understood that the invention is not intended to be limited to the specific embodiments.

EXAMPLE I

*Step A: Preparation of N-(hexahydrobenzyloxycarbonyl)-6-amino-penicillanate of N-ethyl-piperidine.*—1 gm. of 6-amino-penicillanic acid and 1.5 gm. of sodium bicarbonate were dissolved in 30 cc. of water and 20 cc. of acetone were added thereto. Then, while stirring, a solution of 1 gm. of the chloroformate of hexahydrobenzyl in 10 cc. of acetone was slowly added and stirring was continued for about one hour at room temperature. The reaction mixture was then washed several times with ether and after the aqueous phase was cooled, 10 cc. of methyl ethyl ketone were added. The mixture was adjusted to a pH of 2 by addition of 2 N sulfuric acid and the organic phase was separated and the aqueous phase was again extracted several times with methyl ethyl ketone. The extract solutions were combined, washed with iced water and 0.5 cc. of N-ethyl-piperidine were added to the solution of N-(hexahydrobenzyloxycarbonyl)-6-amino-penicillanic acid thus obtained. The mixture was evaporated to dryness in vacuo to obtain 2.21 gm. of raw N-(hexahydrobenzyloxycarbonyl)-6-amino-penicillanate of N-ethyl-piperidine. The product was taken up in 10 cc. of acetone under reflux, and the resulting solution was allowed to stand for crystallization while cooling. The crystals formed thereby were vacuum filtered, washed with iced acetone and dried in vacuo to give the product having a melting point of 138° C. and a specific rotation $[\alpha]_D^{20} = +156°$ (c.=1.12% in acetone). It is very soluble in water, soluble in alcohol, acetone and chloroform, and insoluble in ether and benzene.

*Analysis.*—$C_{23}H_{39}O_5N_3S$; molecular weight=469.93. Calculated: C, 58.82%; H, 8.37%; N, 8.94%; S, 6.83%. Found: C, 58.9%; H, 8.4%; N, 8.6%; S, 7.0%.

N-(hexahydrobenzyloxycarbonyl)-6-amino-penicillanate of N-ethyl-piperidine is not described in the literature.

N-(hexahydrobenzyloxycarbonyl)-6-amino-penicillanate of N-ethyl-piperidine was changed to its alkali metal salts by double decomposition with an alkali metal bicarbonate, such as sodium bicarbonate or potassium bicarbonate, employed in stoichiometric amount.

Potassium N-(hexahydrobenzyloxycarbonyl)-6-amino-penicillanate was a solid, colorless compound in the form of crystalline needles, which were soluble in water and alcohol and insoluble in ether, acetone, anhydrous butanol and methyl ethyl ketone. Its melting point, determined on a Maquenne block, was 250° C. (with decomposition) and its specific rotation $$[\alpha]_D^{20} = +213° \pm 0.5$$

(c.=1% in water).

The said sodium salt and the potassium salt are not described in the literature.

*Step B: Preparation of N-(hexahydrobenzyloxycarbonyl)-6-amino-penicillanic acid.*—5.42 gm. of the N-(hexahydrobenzyloxycarbonyl)-6-amino-penicillanate of N-ethyl-piperidine were dissolved in 75 cc. of water and after 90 cc. of methylene chloride were added, the mixture was cooled slightly and acidified to a pH of 2 by the addition of 10% sulfuric acid. The organic phase was decanted. The aqueous phase was extracted with methylene chloride and the organic phases were combined and evaporated to dryness in vacuo to obtain 4.54 gm. of N-(hexahydrobenzyloxycarbonyl)-6-amino-penicillanic acid.

The said product is not described in the literature.

*Step C: Preparation of the N-(hexahydrobenzyloxycarbonyl)-6-amino-penicillanate of propionyl erythromycin.*—The N-(hexahydrobenzyloxycarbonyl)-6-amino-penicillanic acid obtained in Step B was dissolved in 43 cc. of acetone and after 9.075 gm. of propionyl erythromycin were added, 172 cc. of water were introduced dropwise. Crystallization was initiated, and the mixture was allowed to stand in the refrigerator overnight. The product thus obtained was vacuum filtered, washed and dried. It was recrystallized by dissolving it in acetone and reprecipitating it with water. The precipitate formed was vacuum filtered, washed and dried to recover 9.1 gm. of the N-(hexahydrobenzyloxycarbonyl)-6-amino-penicillanate of propionyl erythromycin having a melting point of (on Kofler block) 162° C. (with decomposition) and a specific rotation $[\alpha]_D^{20} = 5.53°$ (c.=1% in acetone).

The product which was white was soluble in ethanol, aqueous methanol, ether, acetone, benzene and chloroform and very slightly soluble in water.

*Analysis.*—$C_{56}H_{95}O_{19}N_3S$; molecular weight=1,146.4. Calculated: C, 58.66%; H, 8.35%; N, 3.66%; S, 2.79%. Found: C, 59%; H, 8.2%; N, 3.7%; S, 2.8%.

This product is not described in the literature.

Pharmacological data (I) *In vitro activity of N-(hexahydrobenzyloxycarbonyl)-6-amino-penicillanate of propionyl erythromycin against various clinical strains of staphylococci.*—The comparative determinations were effected on a liquid medium (Oxoid No. 2, pH=7.4), after 24 and 40 hours of incubation at 37° C. (in order to measure the bacteriostatic and bactericidal effects) against various pathogenic strains isolated from samples taken from patients. Table I shows the minimum inhibiting concentrations (in μgm./cc.) observed for the various strains which were studied.

TABLE I

| Strains of Staphylococci (No. and Origin) | Erythromycin | | Potassium N-(hexahydrobenzyloxycarbonyl)-6-amino penicillanate | | Compound Z | |
|---|---|---|---|---|---|---|
| | 24 h. | 40 h. | 24 h. | 40 h. | 24 h. | 40 h. |
| 685 (sputum) | >15 | | 2 | 5 | 3 | 15 |
| 9987 | 0.2 | 0.2 | 1 | 3 | 0.05 | 0.2 |
| 2540-69 | 0.05 | 0.1 | 0.05 | 0.05 | 0.05 | 0.05 |
| 6538 | 0.05 | 0.05 | 0.01 | 0.02 | 0.01 | 0.05 |
| 9144 | 0.2 | 0.2 | 0.05 | 0.05 | 0.05 | 0.05 |
| 7541/62 (smear from ears) | >10 | | 2 | >10 | 2 | 5 |
| 7917/62 (pleural exudate) | >10 | | 1 | 3 | 0.4 | 1 |
| 11380/61 (scales) | >10 | | 2 | 5 | 3 | 5 |
| 6106 (antritic pus) | >10 | | 1 | 3 | 1 | 2 |
| 7184/62 (pus) | >10 | | 2 | 5 | 1 | 2 |
| 7406/62 (exudate from abscess) | >10 | | 3 | 10 | 1 | 1 |
| 7539/62 (exudate from dermatosis) | >10 | | 2 | >10 | 5 | >10 |
| 38/63 (pleural exudate) | >20 | | 2 | 3 | 1 | 2 |
| 130/63 (sputum) | >20 | | 3 | 5 | 2 | 2 |
| 152/63 (pus) | >20 | | 2 | 5 | 1 | 2 |
| 188/63 (hemoculture) | 0.2 | 0.2 | 1 | 3 | 0.2 | 0.2 |
| 224/63 (sputum) | 0.1 | 0.2 | 1 | 3 | 0.2 | 0.2 |
| 254/63 (pus) | 0.05 | 0.05 | 1 | 3 | 0.2 | 0.2 |
| 320/63 (sputum) | 20 | | 5 | 10 | 1 | 3 |
| 355/63 (smear from ears) | 0.001 | 0.001 | 3 | 10 | 0.2 | 0.2 |
| L. W | 0.05 | 0.05 | 0.2 | 0.4 | 0.05 | 0.05 |

NOTE.—Compound Z - N - (hexahydrobenzyloxycarbonyl)-6-amino-penicillanate of propionyl erythromycin.

The data show that against strains of staphylococci sensitive to or resistant against erythromycin and/or potassium N-(hexahydrobenzyloxycarbonyl)-6-amino-penicillanate, the hexahydrobenzyloxy-penicillanate of propionyl erythromycin is synergistic because the minimum inhibiting concentrations are lower than those of each of the two active components taken separately.

In addition, the comparison of various strains of pathogenic staphylococci with penicillin G and potassium dimethoxybenzamido-penicillanate which is reputed to be the most active against penicillin-resistant staphylococci secretors of penicillinase, shows the superiority of the activity of the compound of the invention.

TABLE II

| Strains of Staphylococci (No. and Origin) | Penicillin G | | Potassium salt of dimethoxybenzamido penicillanic acid | | N-(hexabenzyloxycarbonyl)-6-amino-penicillanate of propionyl erythromycin | |
|---|---|---|---|---|---|---|
| | 24 h. | 40 h. | 24 h. | 40 h. | 24 h. | 40 h. |
| 685 | 5 | >15 | | | 3 | 15 |
| 9987 | 2 | 15 | | | 0.05 | 0.2 |
| 7917/62 | 1 | 10 | | | 0.4 | 1 |
| 7184/62 | 2 | >10 | | | 1 | 2 |
| 7406/62 | 5 | >10 | | | 1 | 1 |
| 38/63 | 3 | 5 | 2 | 3 | 1 | 2 |
| 130/63 | 3 | 20 | 2 | 3 | 2 | 2 |
| 152/63 | 2 | 10 | 3 | 3 | 1 | 2 |
| 188/63 | 2 | 20 | 2 | 5 | 0.2 | 0.2 |
| 224/63 | 3 | 20 | 2 | 2 | 0.2 | 0.2 |
| 254/63 | 2 | 20 | 3 | 3 | 0.1 | 0.2 |
| 320/63 | 10 | 20 | 2 | 2 | 1 | 3 |
| 355/63 | 10 | 20 | 3 | 10 | 0.2 | 0.2 |
| L.W | 0.1 | 0.2 | 1 | 2 | 0.05 | 0.05 |
| 443/63 (sputum) | 10 | 20 | 3 | 10 | 2 | 5 |
| 586/63 (ulcer smear) | 5 | 20 | 3 | 3 | 2 | |
| 225/63 (stool) | 2 | 20 | 2 | 5 | 0.2 | 0.2 |
| 311/63 (hemoculture) | 10 | >20 | 5 | 10 | 0.2 | 0.2 |
| 345/63 (sputum) | 10 | >20 | 5 | 10 | 2 | 5 |
| 369/63 (wound smear) | 10 | 10 | 3 | 10 | 0.2 | 0.2 |
| 436/63 (urine) | 10 | >20 | 3 | 3 | 2 | 5 |
| 615/63 (sputum) | 1 | 10 | 2 | 3 | 0.2 | 0.2 |
| 972 (sputum) | 5 | >20 | 2 | 3 | 2 | 2 |
| 1029 | 5 | 20 | 3 | 5 | 2 | 2 |
| 1146 (gaseous gangrene pus) | 20 | >20 | 3 | >20 | 0.05 | 0.1 |

(II) *Determination in vivo of the therapeutic activity of N-(hexahydrobenzyloxycarbonyl) - 6 - amino-penicillanate of propionyl erythromycin as compared with potassium N - (hexahydrobenzyloxycarbonyl) - 6 - amino-penicillante and propionyl erythromycin.* (A) *Experimental staphylococcus infections in mice.* (a) *Penicillin-sensitive staphylococci.*—Two series of tests were made, each including three groups of 10 mice infected intraperitoneally with 0.30 cc. of a $10^{-2}$ culture of staphylococci, TIN strain. The animals were given, per os, for two days thereafter (first dose immediately after inoculation, second dose after 18 hours) a daily dose of 0.5 mgm. or 1 mgm. per mouse. The therapeutic effect, determined according to the mortality rate and the importance of the lesions are summarized in Table III.

TABLE III

| Product tested | Dose, mg. | Therapeutic action, percent |
|---|---|---|
| Potassium salt of N-(hexahydrobenzyloxycarbonyl)-6-amino-penicillanic acid | 0.5<br>1 | 90<br>100 |
| Propionyl erythromycin | 0.5<br>1 | 1<br>30 |
| N-(hexahydrobenzyloxycarbonyl)-6-amino-penicillanate of propionyl erythromycin | 0.5<br>1 | 70<br>100 |

These results show the synergistic effect of N-(hexahydrobenzyloxycarbonyl) - 6 - amino-penicillanate of propionyl erythromycin. Propionyl erythromycin had in this case (strain slightly sensitive to erythromycin) but little effect by itself.

(b) *Penicillin-resistant staphylococci.*—Two successive tests were made under the same conditions, each on a series of 10 mice infected intraperitoneally with 1 cc. of a pure staphylococcus culture, strain BEN, with mucin, so as to produce a serious infection. For two days thereafter, the animals were given, per os (first dose immediately after inoculation, second dose after 18 hours), a daily dose of 5 mg. per mouse. In addition, a group of 10 mice were treated by subcutaneous injection of 20,000 units of penicillin G. The therapeutic effectiveness, determined according to the mortality rate and the importance of the lesions, are summarized in Table IV.

TABLE IV

| Product tested | Dose, mg. | Therapeutic action, percent |
|---|---|---|
| Potassium salt of N-(hexahydrobenzyloxycarbonyl)-6-aminopenicillanic acid | 5 | 5 |
| Propionyl erythromycin | 5 | 80 |
| N-(hexahydrobenzyloxycarbonyl)-6-amino-penicillanate of propionyl erythromycin | 5 | 100 |
| Penicilline G subcutaneously | 20,000 U. (12 mg.) | 10 |

This data shows the synergistic effect of N-(hexahydrobenzyloxycarbonyl) - 6 - amino-penicillanate of propionyl erythromycin very distinctly, which demonstrates its value for the peroral treatment of staphylococci against which penicillin G, even at high doses by parenteral administration, has practically no effect.

(B) *Experimental streptococcus and pneumococcus infections.*—The following results were obtained from tests made on groups of 10 mice, by peroral administration, for two days thereafter (first dose immediately after inoculation, second dose after 18 hours) of a daily dose of 5 mg. or 3 mg. per mouse, respectively;

(a) *Hemolytic streptococcus group A (strain 561).*—

TABLE V

| Product tested | Dose, mg. | Therapeutic action, percent |
|---|---|---|
| Potassium salt of N-(hexahydrobenzyloxycarbonyl)-6-aminopenicillanic acid | 5 | 80 |
| Propionyl erythromycin | 5 | 50 |
| N-(hexahydrobenzyloxycarbonyl)-6-amino-penicillanate of propionyl erythromycin | 5 | 70 |

(b) *Pneumococci II.*—

TABLE VI

| Product tested | Dose, mg. | Therapeutic action, percent |
|---|---|---|
| Potassium salt of N-(hexahydrobenzyloxycarbonyl)-6-aminopenicillanic acid | 3 | 90 |
| Propionyl erythromycin | 3 | 35 |
| N-(hexahydrobenzyloxycarbonyl)-6-amino-penicillanate of propionyl erythromycin | 3 | 55 |

These tests show that against streptococcus and pneumococcus infections N-(hexahydrobenzyloxycarbonyl)-6-amino-penicillanate of propionyl erythromycin is active perorally, and that it produces a therapeutic effect which is superior to that which could have been expected from the respective proportions of the antibiotics of which it is constituted.

(III) *Determination of the toxicity.*—N-(hexahydrobenzyloxycarbonyl)-6-amino-penicillanate of propionyl erythromycin was administered per os to mice in aqueous suspension with carboxymethyl cellulose. The $LD_{50}$ of the product was about 1650 mgm./kg. Thus, the toxicity of this compound is low. Doses of 60 and 180 mgm./kg. administered regularly every day to rats over a period of one month by incorporation into the feed produced no sign of toxicity whatsoever. In addition, in therapeutic activity tests, test mice perfectly tolerated a daily dose of 250 mgm/kg. for several days in succession.

Various modifications of the compositions and process of the invention may be made without departing from the spirit or scope thereof, and it is to be understood that the invention is intended to be limited only as defined in the appended claims.

We claim:
1. N - (hexahydrobenzyloxycarbonyl)-6-amino - penicillanate of propionyl erythromycin.

2. A compound selected from the group consisting of N-(hexahydrobenzyloxycarbonyl)-6-amino - penicillanic acid and its alkali metal salts.

3. N - (hexahydrobenzyloxycarbonyl)-6-amino - penicillanic acid.

4. The potassium salt of N-(hexahydrobenzyloxycarbonyl)-6-amino-penicillanic acid.

5. The sodium salt of N-(hexahydrobenzyloxycarbonyl)-6-amino-penicillanic acid.

6. N - (hexahydrobenzyloxycarbonyl)-6-amino - penicillanate of an N-lower alkyl-piperidine.

7. N - (hexahydrobenzyloxycarbonyl)-6-amino - penicillanate of N-ethyl-piperidine.

References Cited by the Examiner

UNITED STATES PATENTS

| | | | |
|---|---|---|---|
| 2,743,268 | 4/56 | Stieff | 260—239.1 |
| 2,793,156 | 5/57 | Souler | 167—65 |
| 2,881,163 | 4/59 | Walasek | 260—210 |
| 2,941,995 | 6/60 | Doyle et al. | 260—239.1 |
| 2,966,442 | 12/60 | Elias et al. | 167—65 |
| 2,996,501 | 8/61 | Doyle et al. | 260—239.1 |
| 3,013,942 | 12/61 | Celmer | 167—65 |
| 3,035,046 | 5/62 | Chancy | 260—239.1 |
| 3,120,514 | 2/64 | Doyle et al. | 260—239.1 XR |

OTHER REFERENCES

Goldberg: Antibiotics Their Chemistry and Non-Medical Uses, published by D. Van Nostrand Company, Inc., Princeton, New Jersey, pages 177–179 and 466, 1959.

Laboratoires Francais de Chimiotherapie, Chemical Abstracts, vol. 58, page 1313, 1963.

Roussel: U.C.L.A.F., Chemical Abstracts, vol. 59, page 2824f, 1963.

IRVING MARCUS, *Primary Examiner.*

NICHOLAS S. RIZZO, *Examiner.*